United States Patent
Redbrandt et al.

(10) Patent No.: US 10,300,919 B2
(45) Date of Patent: May 28, 2019

(54) TORQUE CONTROL OF A VEHICLE POWERTRAIN BASED ON A TIME DERIVATIVE FOR A DYNAMIC TORQUE

(71) Applicant: SCANIA CV AB, Södertälje (SE)

(72) Inventors: Karl Redbrandt, Solna (SE); Martin Evaldsson, Nacka (SE)

(73) Assignee: SCANIA CV AB (SE)

(*) Notice: Subject to any disclaimer, the term of this patent is extended or adjusted under 35 U.S.C. 154(b) by 309 days.

(21) Appl. No.: 15/313,846

(22) PCT Filed: May 25, 2015

(86) PCT No.: PCT/SE2015/050598
§ 371 (c)(1),
(2) Date: Nov. 23, 2016

(87) PCT Pub. No.: WO2015/183160
PCT Pub. Date: Dec. 3, 2015

(65) Prior Publication Data
US 2017/0197629 A1    Jul. 13, 2017

(30) Foreign Application Priority Data

May 30, 2014 (SE) ...................................... 1450655

(51) Int. Cl.
*B60W 10/00* (2006.01)
*B60W 30/20* (2006.01)
(Continued)

(52) U.S. Cl.
CPC ............ *B60W 30/20* (2013.01); *B60W 10/06* (2013.01); *B60W 30/188* (2013.01);
(Continued)

(58) Field of Classification Search
None
See application file for complete search history.

(56) References Cited

U.S. PATENT DOCUMENTS 5,580,330 A * 12/1996 Minowa ................ B60W 10/06
                                                                                   477/110
6,434,472 B1 * 8/2002 Minowa ............. B60K 31/0008
                                                                                   477/115
(Continued)

FOREIGN PATENT DOCUMENTS

EP     2 019 194 A1    1/2009
RU     2267631 C2    1/2006
(Continued)

OTHER PUBLICATIONS

International Search Report dated Oct. 12, 2015 issued in corresponding International Application No. PCT/SE2015/050598.
(Continued)

*Primary Examiner* — Jonathan M Dager
(74) *Attorney, Agent, or Firm* — Ostrolenk Faber LLP (57) ABSTRACT

A desired change of a time derivative of dynamic torque ($Tq_{fw}$), provided to an output shaft from an engine in a vehicle, from a current value to a new desired value is determined. A current rotational speed difference ($\Delta\omega_{pres}$) is determined between a first end of the powertrain in a vehicle, which rotates with a first rotational speed ($\omega_1$), and a second end of the powertrain, which rotates with a second rotational speed. The first rotational speed ($\omega_1$) is then controlled on the basis of the desired value of the time derivative for the dynamic torque ($Tq_{fw}$), a spring constant (k) related to a torsional compliance in the powertrain, and the determined current rotational speed difference $\{\Delta\omega_{pres}\}$. Through control of the first rotational speed, the current value for the time derivative for the dynamic torque is also indirectly controlled towards the desired value.

15 Claims, 5 Drawing Sheets

(51) Int. Cl.
*B60W 50/06* (2006.01)
*F02D 41/02* (2006.01)
*F02D 41/10* (2006.01)
*F02D 41/14* (2006.01)
*B60W 30/18* (2012.01)
*B60W 30/188* (2012.01)
*B60W 10/06* (2006.01)

(52) U.S. Cl.
CPC ...... *B60W 30/18027* (2013.01); *B60W 50/06* (2013.01); *F02D 41/021* (2013.01); *F02D 41/0225* (2013.01); *F02D 41/10* (2013.01); *F02D 41/1401* (2013.01); *F02D 41/1497* (2013.01); *B60W 2030/206* (2013.01); *B60W 2510/0638* (2013.01); *B60W 2510/0657* (2013.01); *B60W 2510/083* (2013.01); *B60W 2520/28* (2013.01); *B60W 2520/30* (2013.01); *B60W 2710/0644* (2013.01); *B60W 2710/0666* (2013.01); *B60W 2710/0672* (2013.01); *B60W 2710/083* (2013.01); *B60W 2720/28* (2013.01); *B60W 2720/30* (2013.01); *F02D 2041/1431* (2013.01); *F02D 2041/1432* (2013.01); *F02D 2200/101* (2013.01); *F02D 2200/1002* (2013.01); *F02D 2200/50* (2013.01); *F02D 2200/501* (2013.01); *F02D 2250/18* (2013.01)

(56) References Cited

U.S. PATENT DOCUMENTS

| | | | | |
|---|---|---|---|---|
| 7,937,211 B2* | 5/2011 | Aso | ............ | F02D 41/10 123/399 |
| 8,068,944 B2* | 11/2011 | Tanaka | ............ | F02D 11/105 701/4 |
| 8,915,816 B2* | 12/2014 | Bergquist | ............ | B60K 6/387 475/150 |
| 9,284,902 B2* | 3/2016 | Keller | ............ | F02D 41/0215 |
| 9,863,345 B2* | 1/2018 | Wong | ............ | F02D 41/0087 |
| 9,920,697 B2* | 3/2018 | Pochner | ............ | F02D 9/02 |
| 9,938,908 B2* | 4/2018 | Li | ............ | F02D 11/02 |
| 10,036,339 B2* | 7/2018 | Evaldsson | ............ | B60W 50/06 |
| 10,046,756 B2* | 8/2018 | Pettersson | ............ | B60K 6/365 |
| 2004/0107034 A1* | 6/2004 | Togai | ............ | B60K 26/04 701/54 |
| 2005/0001480 A1* | 1/2005 | Tabata | ............ | F02D 11/105 303/141 |
| 2009/0093937 A1* | 4/2009 | Lupo | ............ | B60W 30/20 701/84 |
| 2012/0101705 A1* | 4/2012 | Templin | ............ | B60W 30/20 701/99 |
| 2012/0130608 A1* | 5/2012 | Fujii | ............ | F16H 61/061 701/54 |
| 2015/0032350 A1* | 1/2015 | Redbrandt | ............ | B60W 10/02 701/68 |
| 2015/0203102 A1* | 7/2015 | Pettersson | ............ | B60K 6/365 477/3 |
| 2017/0001621 A1* | 1/2017 | Lindstrom | ............ | B60K 1/02 |
| 2018/0073454 A1* | 3/2018 | Kono | ............ | F02D 11/106 |

FOREIGN PATENT DOCUMENTS

WO WO 2011/003544 A2 1/2011
WO WO 2011/154234 A1 12/2011

OTHER PUBLICATIONS

International Search Report and Written Opinion of the International Searching Authority dated Oct. 21, 2015 in corresponding International Application No. PCT/SE2015/050598 (12 total pages).
Peter Templin, et al., "An LQR Torque Compensator for Driveline Oscillation Damping," Control Applications, (CCA) & Intelligent Control, (ISIC), 18th IEEE International Conference on Control Applications Part of 2009 IEEE Multi-conference on Systems and Control, Saint Petersburg, Russia, Jul. 8-10, 2009, pp. 352-356.
M. Berriri, et al., "Active Damping of Automotive Powertrain Oscillations by a Partial Torque Compensator," Pergamon Press, Oxford, GB, Control Engineering Practice, vol. 16, No. 7, Jul. 1, 2008, pp. 874-883.
Russian Federation Office Action and Search Report, dated Aug. 28, 2018, issued in corresponding Russian Federation Application No. 2016150085/07(080389). English translation. Total 10 pages.

* cited by examiner

TORQUE CONTROL OF A VEHICLE POWERTRAIN BASED ON A TIME DERIVATIVE FOR A DYNAMIC TORQUE

CROSS-REFERENCE TO RELATED APPLICATIONS

The present application is a 35 U.S.C. §§ 371 national phase conversion of PCT/SE2015/050598, filed May 25, 2015, which claims priority of Swedish Patent Application No. 1450655-4, filed May 30, 2014, the contents of which are incorporated by reference herein. The PCT International Application was published in the English language.

TECHNICAL FIELD

The present invention relates to a system for control of a change in a time derivative $\Delta T'q_{fw}$ for a dynamic torque. The present invention also relates to a method for control of a change in a time derivative $\Delta T'q_{fw}$ for a dynamic torque, and a computer program and a computer program product, which implement the method according to the invention.

BACKGROUND

The following background description constitutes a description of the background to the present invention, which does not, however, necessarily constitute prior art.

Vehicles, for example cars, buses and trucks, are driven forward by an engine torque produced by an engine in the vehicle. This engine torque is provided to the vehicle's driving wheels through a powertrain in the vehicle. The powertrain contains a range of inertias, torsional compliances and damping components, meaning that the powertrain, to a varying degree, may have an impact on the engine torque being transferred to the driving wheels. Thus, the powertrain has a torsional compliance/flexibility and a play, which means that oscillations in torque and/or revolutions, so called powertrain oscillations, may occur in the vehicle when the vehicle, for example, sets off once a torque has been requested from the engine. These oscillations in torque and/or revolutions occur when forces, which have been built up in the powertrain in the period between the engine providing the torque and the vehicle moving off, are released as the vehicle moves off. Powertrain oscillations may make the vehicle rock longitudinally, which is described in further detail below. These rocking movements in the vehicle are very disruptive for the driver of the vehicle.

Therefore, in some prior art solutions for avoiding these powertrain oscillations, preventive strategies have been used at the request of the engine torque. Such strategies may utilise limited torque ramps when the engine torque is requested, whereat these torque ramps have been adapted so that the requested engine torque is limited in such a way, that the powertrain oscillations are reduced, or do not occur at all.

The torque ramps which are used today when an engine torque is requested thus introduce a limit to how the torque may be requested by the engine in the vehicle. This limitation is necessary under the solutions of prior art, in order to reduce the disruptive powertrain oscillations. Allowing the driver and/or, for example, a cruise control to freely request a torque would, with current art systems, often give rise to considerable and disruptive powertrain oscillations, which is why limiting torque ramps are used.

The limiting torque ramps in current art are normally static. Static torque ramps, which may also be termed static torques, have an advantage in that they are of a very limited complexity, which is one of the reasons why they are so often used. However, static torque ramps have a number of disadvantages, relating to the fact that they are not optimized to all driving events that the vehicle may be exposed to. For certain driving modes, the static and limited torque ramps give rise to a reduction in vehicle performance, as, due to the torque ramp, the requested torque is unnecessarily low for driving modes, wherein it would have been possible to request more engine torque without the occurrence of powertrain oscillations. For other driving modes, the torque ramp does not limit the requested torque sufficiently, which means that powertrain oscillations occur and therefore rocking movements in the vehicle. Therefore, the use of torque ramps, for certain driving modes, provides non-optimal torques, which may give rise to an unnecessary reduction in vehicle performance and/or rocking that reduces the comfort, caused by powertrain oscillations.

BRIEF DESCRIPTION OF THE INVENTION

It is therefore one objective of the present invention to provide a method and a system for the control of a change in a time derivative $\Delta T'q_{fw}$ for a dynamic torque, which at least partly solves the prior art problems.

The present invention relates to the control of a change of a time derivative $\Delta T'q_{fw}$ for a dynamic torque, which is provided to an output shaft from an engine in a vehicle.

According to the present invention, a desired change $\Delta T'q_{fw}$ of the time derivative is determined for the dynamic torque, wherein the change goes from a current value $T'q_{fw\_pres}$ to a new desired value $T'q_{f\_des}$ for the dynamic torque.

A current rotational speed difference $\Delta \omega_{pres}$ is established between a first end of the powertrain in a vehicle, rotating with a first rotational speed $\omega_1$, and a second end of the powertrain, rotating with a second rotational speed $\omega_2$.

The first engine speed $\omega_1$ is then controlled, based on the desired value $T'q_{fw\_des}$ of the time derivative for the dynamic torque, on a spring constant k related to a torsional compliance in the powertrain, and on the determined current speed difference $\Delta \omega_{pres}$.

By means of the control of the first rotational speed $\omega_1$, the change in the time derivative $\Delta T'q_{fw}$ for the dynamic torque is also indirectly controlled in the direction of the desired value $T'q_{fw\_des}$.

The present invention thus provides a control of the time derivative/gradient $T'q_{fw}$ for the dynamic torque, by means of providing changes $\Delta T'q_{fw}$ of this gradient/derivative. The provided changes in the time derivative $\Delta T'q_{fw}$ for the dynamic torque may be used, in order to achieve a direction/gradient for a graph corresponding to the time derivative $T'q_{fw}$. This achieved direction/gradient, i.e. the time derivative $T'q_{fw}$ for the dynamic torque, may then be used as suitable initial values for further control of the dynamic torque $Tq_{fw}$.

The rapid changes of the time derivative $T'q_{fw}$ for the dynamic torque may, by means of this present invention, be made substantially instantaneous, which means that the control of the dynamic torque $Tq_{fw}$ may be easier to optimize, in order to increase the performance of the vehicle and/or increase the driver comfort.

These rapid changes of the time derivative $T'q_{fw}$ for the dynamic torque may, for example, be used in connection with the ramping down prior to and/or after a shift operation, during ramping up prior to and/or after a shift operation, and/or for other events when the dynamic torque needs to be changed.

According to the present invention, the profile of the requested torque $Tq_{demand}$ is formed in such a manner that the dynamic torque $Tq_{fw}$ has an, at least in part, substantially even and non-oscillating profile, or does at least provide oscillations with significantly lower amplitudes than prior art. The present invention results in oscillations, which do not have a negative impact on the comfort in the vehicle.

In this way, powertrain oscillations may be reduced in number and/or size for a number of driving modes, wherein previous adjustments of the requested torque $Tq_{demand}$ would have resulted in problematic rocking of the vehicle. These driving modes include a commencement of a request for a torque from the engine, a so-called "TIPIN" and a ceasing of a request for a torque from the engine, a so-called "TIPOUT". The present invention also reduces powertrain oscillations for driving modes comprising a play in the powertrain—in other words when, for example, the cogs of two cogwheels in the gearbox for a brief period of time do not engage, in order to later engage again —, which may, for example, occur in the transition between dragging the engine and acceleration/request of torque, when engaging the clutch, or for the above mentioned shift operation. Therefore, for all these driving modes the present invention may prevent rocking of the vehicle caused by powertrain oscillations, whereby the driver's comfort is increased.

Powertrain oscillations caused by external impact, for example caused by a bump in the road, may also quickly be reduced and/or damped with the present invention.

Furthermore, the use of the present invention also provides a significant reduction in the wear of the powertrain of the vehicle. The reduction in the wear, achieved by the invention, provides an extended life for the powertrain, which of course is advantageous.

BRIEF DESCRIPTION OF DRAWING FIGURES

The invention will be illustrated in more detail below, along with the enclosed drawings, where similar references are used for similar parts, and where.

DESCRIPTION OF PREFERRED EMBODIMENTS

Figure 1:
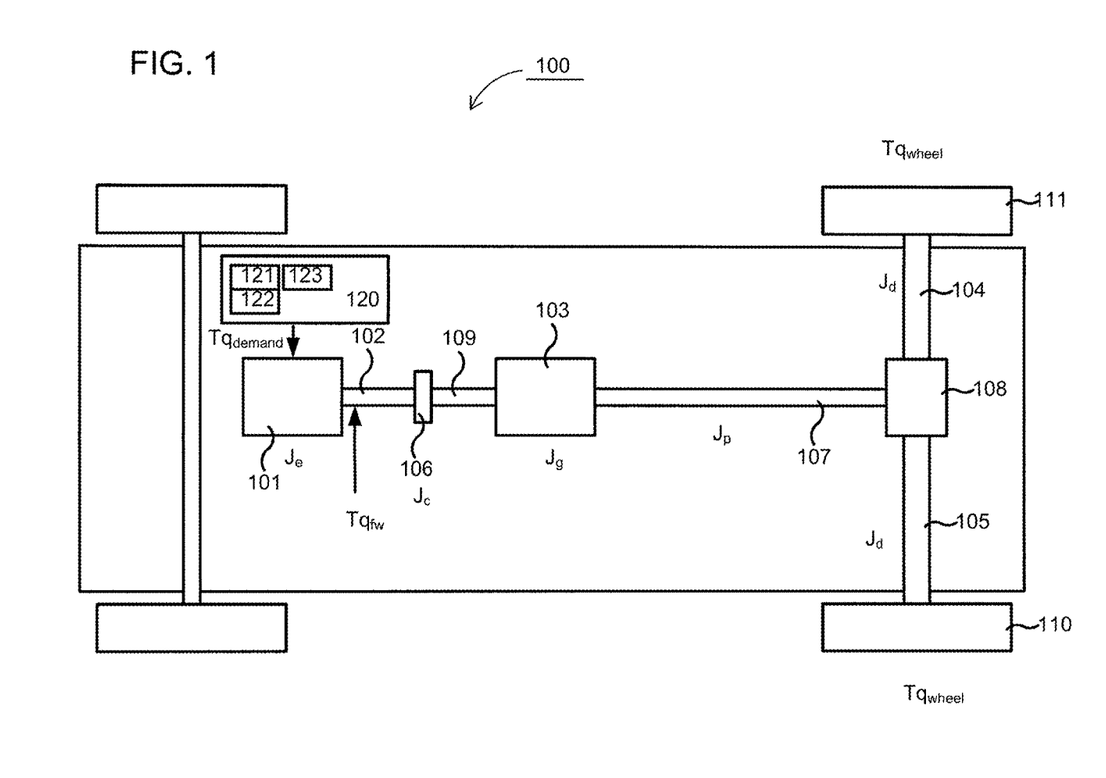
FIG. 1 shows an example of a vehicle for use of the invention.

FIG. 1 schematically shows a heavy example vehicle 100, such as a truck, a bus or similar, which will be used to explain the present invention. The present invention is, however, not limited to use in heavy goods vehicles, but may also be used in lighter vehicles such as cars. The vehicle 100 shown schematically in FIG. 1 comprises a pair of driving wheels 110, 111. The vehicle furthermore comprises a powertrain with an engine 101, which may be for example a combustion engine, an electrical motor or a combination of these, a so called hybrid. The engine 101 may, for example, in a customary fashion, via an output shaft 102 on the engine 101, be connected with a gearbox 103, possibly via a clutch 106 and an input shaft 109 connected to the gearbox 103. An output shaft 107 from the gearbox 103, also known as a propeller shaft, drives the driving wheels 110, 111 via a final gear 108, such as e.g. a customary differential, and drive shafts 104, 105 connected with said final gear 108. A control device 120 is schematically illustrated as providing control signals to the engine 101. As described below, the control device may contain a first 121 and a second 122 determining device, and a torque control device 123. These devices are described in more detail below.

When a driver of the motor vehicle 100 increases a torque request to the engine 101, for example by inputting via an input means, such as depressing an accelerator pedal, this may result in a relatively rapid change in the powertrain's torque. This torque is resisted by the driving wheels 110, 111, due to their friction against the ground and the rolling resistance of the motor vehicle. The drive shafts 104, 105 are hereby exposed to a relatively powerful torque.

For reasons of cost and weight, among others, the drive shafts 104, 105 are not normally dimensioned to handle this severe stress without being impacted. In other words, the drive shafts 104, 105 have a relatively great torsional compliance. The propeller shaft 107 may also have a relatively great torsional compliance. The other components of the drive shaft may also have some form of torsional compliance. Due to the relative torsional compliance of the drive shafts 104, 105, they act as torsion springs between the drive shafts 110, 111 and the final gear 108. In the same way, the other torsional compliances in the powertrain also act as torsion springs between the location of the various components and the driving wheels 110, 111. Once the rolling resistance of the vehicle no longer manages to hold back the torque from the powertrain, the motor vehicle 100 will start to roll, whereby the force in the drive shafts 104, 105 acting as a torsion spring will be released. When the motor vehicle 100 starts to set off, this released force may cause powertrain oscillations, meaning that the motor vehicle starts to rock in a longitudinal direction, i.e. in the driving direction. The driver of the motor vehicle experiences this rocking as very uncomfortable. A driver desires a soft and comfortable driving experience and when such a comfortable driving experience is achieved, this give a sense of the motor vehicle being a refined and well developed product. Therefore, uncomfortable powertrain oscillations should if possible be avoided.

The present invention relates to the control of a change of a time derivative $\Delta T'q_{fw}$ for a torque $Tq_{demand}$ requested from the engine 101. The engine 101 provides a dynamic torque $Tq_{fw}$ in response to a torque $Tq_{demand}$ requested from the engine, where this dynamic torque $Tq_{fw}$ constitutes a torque at the flywheel connecting the engine 101 to its output shaft 102. This dynamic torque is the torque $Tq_{fw}$, which, through a gear ratio i for the powertrain, relates to a dynamic wheel torque $Tq_{wheel}$ supplied to the driving wheels 110, 111 of the vehicle. The gear ratio i here constitutes the total gear ratio of the powertrain, comprising for example the gearbox ratio for a specific gear. In other words, a requested engine torque $Tq_{demand}$ results in a dynamic wheel torque $Tq_{wheel}$ at the vehicle's driving wheels 110, 111.

The present invention thus relates to the control of a change of a time derivative $\Delta T'q_{fw}$ for a dynamic torque, which is provided to an output shaft from an engine in a vehicle.

According to the present invention, a desired change $\Delta T'q_{fw}$ of the time derivative is determined for the dynamic torque, wherein the change goes from a current value $T'q_{fw\_pres}$ to a new desired value $T'q_{fw\_des}$ for the dynamic torque.

A current rotational speed difference $\Delta\omega_{pres}$ is established between a first end of the powertrain in a vehicle, rotating with a first rotational speed $\omega_1$, and a second end of the powertrain, rotating with a second rotational speed $\omega_2$.

The first rotational speed $\omega_1$ is then controlled, based on the desired value $T'q_{fw\_des}$ of the time derivative for the dynamic torque, on a spring constant k related to a torsional compliance in the powertrain, and on the determined current rotational speed difference $\Delta\omega_{pres}$.

By means of the control of the first rotational speed $\omega_1$ a current value $T'q_{fw\_pres}$ for the time derivative for the dynamic torque is also indirectly controlled, in the direction of the desired value $T'q_{fw\_des}$.

The control of the first rotational speed $\omega_1$, which also provides an indirect control of the change to the time derivative $\Delta T'q_{fw}$ for the dynamic torque, may be performed by a system arranged for the control of a change of a time derivative $\Delta T'q_{fw}$ for a dynamic torque, which is provided to an output shaft from an engine in a vehicle.

The system according to the present invention comprises a first determining device 121, which is arranged to determine a desired change $\Delta T'q_{fw}$ of the time derivative for the dynamic torque, wherein the change goes from a current value $T'q_{fw\_pres}$ to a new desired value $T'q_{fw\_des}$ for the dynamic torque.

The system also comprises a second determining device 122, which is arranged to determine a current rotational speed difference $\Delta\omega_{pres}$ between a first end of the powertrain in a vehicle, rotating with a first rotational speed $\omega_1$, and a second end of the powertrain, rotating with a second rotational speed $\omega_2$.

The system also comprises a torque control device 123, which is arranged to control the first rotational speed $\omega_1$, based on the desired value $T'q_{fw\_des}$ of the time derivative for the dynamic torque, on a spring constant k related to a torsional compliance in the powertrain, and on the determined current rotational speed difference $\Delta\omega_{pres}$.

In addition, the invention relates to a motor vehicle 100, e.g. a car, a truck or a bus, comprising at least a system for the control of a time derivative $\Delta T'q_{fw}$ for a dynamic torque according to the invention.

Figure 2:
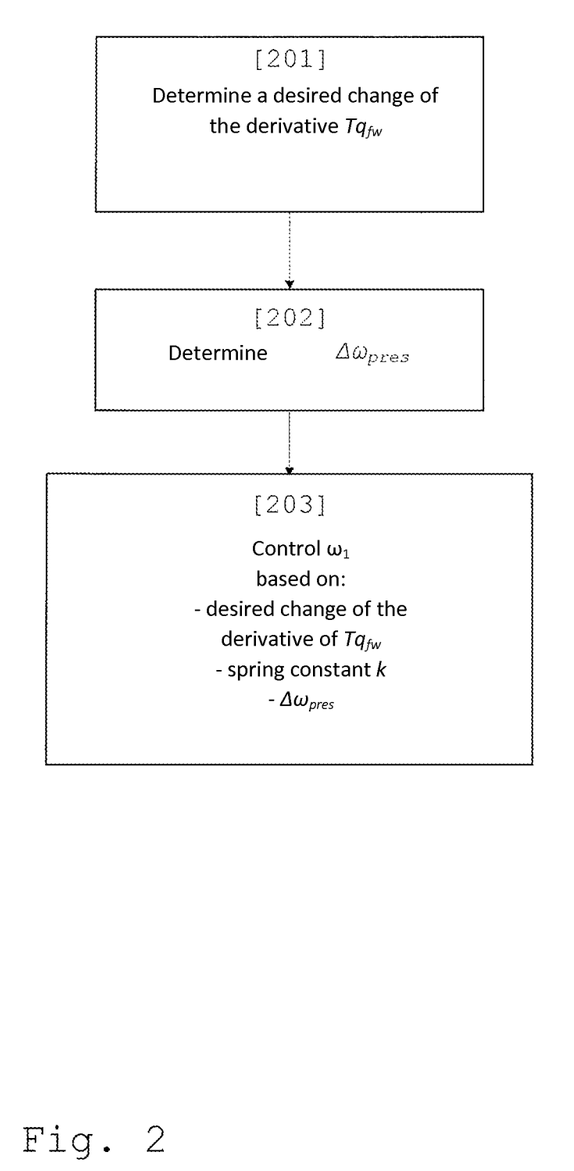
FIG. 2 shows a flow chart for a method according to one embodiment of the present invention.

FIG. 2 shows a flow chart for the method for control of a change of a time derivative $\Delta T'q_{fw}$ for a dynamic torque, according to an embodiment of the present invention.

In a first step 201, a desired change $\Delta T'q_{fw}$ of the time derivative for the dynamic torque is determined, for example by means of a first determining device 121, wherein the change is made up of a difference between a current value $T'q_{fw\_pres}$ and a new desired value $T'q_{fw\_des}$ for the dynamic torque.

In a second step 202, for example using a second determining device 122, a current rotational speed difference $\Delta\omega_{pres}$ is determined between a first end of the powertrain, rotating with a first rotational speed $\omega_1$, and a second end of the powertrain, rotating with a second rotational speed $\omega_2$.

In a third step 203, the first rotational speed $\omega_1$ is controlled, for example by means of a torque control device 123, based on the desired value $T'q_{fw\_des}$ of the time derivative for the dynamic torque, on a spring constant k related to a torsional compliance in the powertrain, and on the determined current rotational speed difference $\Delta\omega_{pres}$. By means of the control of the first rotational speed $\omega_1$, a current value $T'q_{fw\_pres}$ pres for the time derivative for the dynamic torque is also indirectly controlled in the direction of the desired value $T'q_{fw\_des}$.

Therefore, by using the present invention a change of the time derivative $\Delta T'q_{fw}$ for a dynamic torque is achieved, which may be used for achieving rapid changes of the time derivative $T'q_{fw}$ for the dynamic torque. In other words, a desired direction/gradient of a graph corresponding to the time derivative $T'q_{fw}$ may rapidly be achieved by the use of the present invention. This direction/gradient, i.e. the time derivative $T'q_{fw}$, may then be used as suitable initial values for further control of the dynamic torque $Tq_{fw}$.

The rapid changes of the time derivative $T'q_{fw}$ for the dynamic torque may, by means of this present invention, be made substantially instantaneously, which means that the control of the dynamic torque $Tq_{fw}$ may be easily optimized, in order to increase the performance of the vehicle and/or increase the driver comfort, by achieving an in performance terms optimized value for the requested torque $Tq_{demand}$, which does not result in rocking of the vehicle.

Prior art has controlled the static torque, which has caused powertrain oscillations in the vehicle. By using this present invention, the dynamic torque $Tq_{fw}$ may instead be controlled by means of rapid changes in the time derivative $T'q_{fw}$, which means that powertrain oscillations may be reduced considerably. The reduction in powertrain oscillations increases the driver's comfort in the vehicle. In other words, a physical torque, which is the result of fuel being injected into the engine and the response by the powertrain due to its characteristics, is here controlled, this being the dynamic torque $Tq_{fw}$. The dynamic torque $Tq_{fw}$ therefore corresponds to the torque that is provided by the gearbox 103, which also may be expressed as the torque that is provided by a flywheel in the powertrain, whereat the influence from the powertrain—such as the engine's acceleration and its effect —, is comprised within the dynamic torque $Tq_{fw}$. Thus, a physical control of the dynamic torque $Tq_{fw}$ is achieved when the present invention is used.

The dynamic torque $Tq_{fw}$ may for example be controlled in order to achieve specific torque ramps, such as ramping down or up after shift operations in the gearbox 103. The dynamic torque $Tq_{fw}$ may also be controlled in order to achieve desired specific torque values, which is useful for example for cruise control, that is the use of a cruise control device for the control of the speed of the vehicle, or for pedal driving, that is manual control of the vehicle speed. This may be expressed as desired values $Tq_{fw\_reg}$ and/or desired derivatives $T'q_{fw\_req}$ for the dynamic torque being possible to achieve through the control according to the present invention.

The dynamic torque $Tq_{fw}$, provided by the engine 101 to its output shaft 102, may in one embodiment be determined based on a delayed requested engine torque $Tq_{demand\_delay}$, the rotational inertia of the engine $J_e$ and the rotational acceleration $\dot\omega_e$ of the engine 101.

The delayed requested engine torque $Tq_{demand\_delay}$ has been delayed with a period of time $t_{inj}$ elapsing in order to execute an injection of fuel into the engine 101, i.e. the period of time it takes from the start of the injection until the fuel is ignited and combusted. This injection period $t_{inj}$ is typically known, but its length varies, for example for different engines and/or for different speeds in an engine. The dynamic torque $Tq_{fw}$ may here be determined as a difference between estimated values for a delayed requested engine torque $Tq_{demand\_delay}$ and the torque value $J_e\dot\omega_e$ comprising measured values for rotational acceleration $\dot\omega_e$ of the engine. In one embodiment, the dynamic torque $Tq_{fw}$ may therefore be represented by a signal difference between a signal for an estimated delayed requested engine torque $Tq_{demand\_delay}$ and the torque signal $J_e\dot{\omega}_e$ comprising measured values for rotational acceleration $\dot{\omega}_e$ of the engine.

The delayed requested engine torque $Tq_{demand\_delay}$ may in one embodiment be defined as a net torque, meaning that losses and/or frictions are compensated, whereby a requested net engine torque and a delayed requested engine torque are achieved.

The dynamic torque $Tq_{fw}$, as provided by the motor 101 to its output shaft 102, thus corresponds, according to one embodiment, to the delayed requested engine torque $Tq_{demand\_delay}$ less a torque corresponding to the engine's rotational inertia $J_e$, multiplied with a rotational acceleration $\dot{\omega}_e$ for the engine 101, i.e. $Tq_{fw}=Tq_{demand\_delay}-J_e\dot{\omega}_e$, the delayed requested engine torque $Tq_{demand\_delay}$ having been delayed by the injection time $t_{inj}$.

The rotational acceleration $\dot{\omega}_e$ for the engine 101 may here be measured by generating a time derivative of the engine speed $\omega_e$. The rotational acceleration $\dot{\omega}_e$ is then rescaled to a torque in accordance with Newton's second law, by being multiplied with the rotational inertia torque $J_e$ for the engine 101; $J_e\dot{\omega}_e$.

According to another embodiment, the dynamic torque $Tq_{fw}$ provided by the engine 101 may also be determined by the use of a torque sensor being placed at a suitable arbitrary position along the vehicle's powertrain. Thus, a torque value measured by such a sensor may also be used in the feedback according to the present invention. Such a measured torque, which has been obtained by means of a torque sensor after the flywheel, i.e. somewhere between the flywheel and the driving wheels, corresponds to the physical torque that the dynamic engine torque $Tq_{fw}$ contributes. If a good a torque reporting may be achieved by means of the use of such a torque sensor, the torque sensor should therefore provide a torque signal corresponding to the dynamic torque $Tq_{fw}$.

As is illustrated in FIG. 1, the different parts of the powertrain have different rotational inertias, comprising a rotational inertia $J_e$ for the engine 101, a rotational inertia $J_g$ for the gearbox 103, a rotational inertia $J_c$ for the clutch 106, a rotational inertia $J_p$ for the propeller shaft and rotational inertias $J_d$ for each drive shaft 104, 105. Generally speaking, all rotating bodies have a rotational inertia J, which depends on the mass of the body and the distance of the mass from the rotational center. For reasons of clarity, in FIG. 1, only the above mentioned rotational inertias have been added, and their significance for the present invention will be described hereafter. A person skilled in the art does, however, realize that more moments of inertia may occur in a powertrain than those listed here.

According to one embodiment of the present invention, the assumption is made that the rotational inertia $J_e$ of the engine 101 is much greater than other rotational inertias in the powertrain, and that the rotational inertia $J_e$ of the engine 101 therefore dominates a total rotational inertia J of the powertrain. That is to say $J=J_e+J_g+J_c+J_p+2J_d$, but as $J_e \gg J_g$, $J_e \gg J_c$, $J_e \gg J_p$, $J_e \gg J_d$ the total rotational inertia J of the powertrain is more or less equal to the rotational inertia $J_e$ of the engine 101; $J \approx J_e$. A non-limiting example for the values for these rotational inertias may be mentioned: $J_e=4$ kgm$^2$, $J_g=0.2$ kgm$^2$, $J_c=0.1$ kgm$^2$, $J_p=7*10^{-4}$ kgm$^2$, $J_d=5*10^{-5}$ kgm$^2$, which means that the assumption that the rotational inertia $J_e$ of the engine 101 dominates the total rotational inertia J of the powertrain; $J \approx J_e$; is correct, as the other parts of the powertrain are much easier to rotate compared with the engine 101. The aforementioned example values are values on the engine side of the gearbox, which means that they will vary along the powertrain depending on the gear ratio used. Regardless which gear ratio is being used, the rotational inertia $J_e$ of the engine 101 is much greater than other rotational inertias, and therefore dominates the total rotational inertia J of the powertrain.

As the rotational inertia $J_e$ of the engine dominates the total rotational inertia J of the powertrain; $J \approx J_e$; the dynamic wheel torque $Tq_{wheel}$ corresponds to the dynamic torque $Tq_{fw}$ provided by the engine, multiplied with the gear ratio i, $Tq_{wheel}=Tq_{fw}*i$ for the powertrain. This considerably simplifies the control of the requested torque $Tq_{demand}$ according to the present invention, as it is therefore very easy to determine the dynamic torque $Tq_{wheel}$ at the wheels. Hereby, the control of the requested torque $Tq_{demand}$ according to the present invention may continuously be adapted to the dynamic torque $Tq_{wheel}$ provided to the wheels, which means that powertrain oscillations may be reduced significantly, or even be avoided completely. The engine torque $Tq_{demand}$ may then be requested in such a way that a desired dynamic torque $Tq_{wheel}$ is continuously provided at the wheels, which means that an even torque profile is achieved for the dynamic torque $Tq_{wheel}$ of the wheels, and that no oscillations occur for the wheels' torque profile, or that they have considerably lower amplitude than in prior art control of the requested engine torque $Tq_{demand}$.

The powertrain may be approximated as a relatively weak spring, which may be described as:

$$Tq_{fw}=Tq_{demand\_delay}-J_e\dot{\omega}_e=k(\theta_e-\theta_{wheel})+c(\omega_e-\omega_{wheel}), \quad \text{(equation 1)}$$

where:
- $\theta_e$ is an angle for the engine's output shaft 102, i.e. a total increase of the engine's performance since a starting point. For example, the angle $\theta_e$ 1000 revs, which corresponds to $1000*2\pi$ radians, if the engine has been running for a minute at the speed 1000 rpm;
- $\omega_e$ is the time derivative of $\theta_e$, i.e. a rotational speed for the shaft 102;
- $\theta_{wheel}$ is an angle for one or more of the driving wheels 110, 111, i.e. a total performance increase of the wheels since a starting point;
- $\omega_{wheel}$ is the time derivative of $\theta_{wheel}$ i.e. a rotational speed for the wheels;
- k is a spring constant, which is related to a torque required for turning up the spring in order to achieve a certain gradient, for example in order to obtain a certain difference $\Delta\theta$ between $\theta_e$ and $\theta_{wheel}$. A low value for the spring constant k corresponds to a weak and swaying spring/powertrain;
- c is a damping constant for the spring.

A derivation of equation 1 gives:

$$T'q_{fw}=k(\omega_e-\omega_{wheel})+c(\dot{\omega}_e-\dot{\omega}_{wheel}) \quad \text{(equation 2)}$$

It is reasonable to assume that the powertrain often may be considered as an undamped spring, i.e. that c=0, and that the spring constant k is dominated by the spring constant $k_{drive}$ for the drive shafts 104, 105, i.e.

$$k = \frac{k_{drive}}{i^2}$$

where i is the gear ratio. If c=0 then equation 2 is simplified as:

$$T'q_{fw}=k(\omega_e-\omega_{wheel}) \quad \text{(equation 3)}$$

As stated in equation 3, the derivatives, that is the gradient, for the dynamic torque $Tq_{fw}$ may be considered to be proportional to the difference $\Delta\omega$ between the rotational speed $\omega_{wheel}$ for the wheels 110, 111 and the rotational speed $\omega_e$ of the engine/shaft 102.

This also means that a desired torque ramp $T'q_{fw\_req}$, that is a torque with a gradient and therefore changes in value over time, may be achieved by introducing a difference $\Delta\omega$ between the rotational speed $\omega_{wheel}$ of the wheels 110, 111 and the rotational speed $\omega_e$ of the engine/shaft 102; $\Delta\omega=\omega_e-\omega_{wheel}$:

$$\omega_{ref} = \omega_{wheel} + \frac{\dot{T}_{q_{fw\_req}}}{k}; \quad \text{(equation 4)}$$

where $\omega_{ref}$ is the reference rotational speed to be requested from engine 101 in order to achieve the torque ramp.

The difference $\Delta\omega$ in the rotational speed has above, for the equations 1-4, been described as a difference between the rotational speeds $\omega_{wheel}$ for the wheels 110, 111 and the rotational speed $\omega_e$ of the engine/shaft. However, it must be realized that the difference $\Delta\omega$ in more general terms may be described as a difference in rotational speed between a first end of the powertrain, rotating with a first rotational speed $\omega_1$ hand a second end of the powertrain, rotating at a second rotational speed $\omega_2$; $\Delta\omega=\omega_1-\omega_2$, wherein the first end, for example, may be a part of the engine 101 or the output shaft 102 from the engine, and the second end, for example, may be the driving wheels 110, 111 or the drive shafts 104, 105. As stated above, a time derivative/gradient for the dynamic torque is proportional to a current rotational speed difference $\Delta\omega_{pres}$ between the first rotational speed $\omega_1$ and the second rotational speed $\omega_2$.

As described above, the first rotational speed $\omega_1$ is controlled, according to the present invention, based, among others, on the spring constant k. The spring constant k is related to a torsional compliance in the powertrain. In many applications, the spring constant k is dominated by the spring constant $k_{drive}$ for the drive shafts 104, 105, related to the gear ratio for the powertrain, that is $$k \approx \frac{k_{drive}}{i^2},$$

where i is the gear ratio.

In other applications, for which the spring constant k is not dominated by the spring constant $k_{drive}$ for the drive shafts 104, 105, or for which the actual value of the spring constant k is important and is not permitted to be approximated, a total spring constant $k_{tot}$ is determined for the powertrain, which comprises torsional compliances for substantially all components of the powertrain.

The spring constant k may be determined based on knowledge of which components are included in the powertrain and the torsional compliances of the included components, and how the components of the powertrain are configured. As the configuration of the components and their relationship with the spring constant k is known through measurements made during the construction and/or fitting of the powertrain, it is possible to determine the spring constant k.

The spring constant k may also be determined by means of adaptive estimation when the vehicle is being driven. This estimation may then take place, at least partially continuously, during suitable driving sections. The estimate is based on a difference $\Delta\omega$ between the rotational speed to $\omega_{wheel}$ of the wheels 110, 111 and the rotational speed $\omega_e$ of the engine/shaft 102 during a torque ramp and on the gradient of the torque ramp, by determining the ratio between the derivative of the dynamic torque and the difference $\Delta\omega$;

$$k = \frac{T\dot{}q_{fw}}{\Delta\omega}.$$

For example, the spring constant for the derivative 3000 Nm/s and the rotational difference 100 rpm is then $$k = \frac{3000}{100} * \frac{\pi}{30} = 286 \text{ Nm/row}.$$

The estimates may advantageously be carried out more than once, and thus an average value for the results is determined.

According to one embodiment of the present invention, the torque control device 123 is arranged to request torque from the engine 101, wherein at least one significant change $\Delta Tq_{demand}$ of the requested torque may be used to achieve the desired change of the time derivative $\Delta T'q_{fw}$ for the dynamic torque. In other words, the torque control device 123 may here indirectly control the first rotational speed $\omega_1$, which for example could be the engine's engine speed $\omega_e$, by controlling the requested torque $Tq_{demand}$.

A significant change $\Delta Tq_{demand}$ of the torque requested from the engine, is in this document to be understood as a change $\Delta Tq_{demand}$ of the torque by an amount being within an interval corresponding to 10%-100% of a total available torque for the engine, wherein this change $\Delta Tq_{demand}$ takes place during a calculation period for a control device, which performs the control. The length of this calculation period may, for example, depend on a clock frequency for a processor in the control device. Control devices often determine updated control parameters/control values with a predetermined frequency, i.e. a certain time interval, wherein the length of the calculation period may correspond to such a time period, sometimes also known as a "tick" for the control system.

The at least one significant change $\Delta Tq_{demand}$ of the requested torque, which is to provide the change to the time derivative $\Delta T'q_{fw}$, should extend for a time period $t_{inertia}$, which is longer than one injection time period $t_{inj}$, required for the injection system to inject fuel into engine 101 and to ignite; $t_{inertia} > t_{inj}$. Hereby, it is ensured that several injections of fuel may be made, which is a condition for the at least one significant change $\Delta Tq_{demand}$ to take place. Therefore, the requested torque here must be changed from a first value $Tq_{demand\_1}$ to a second value $Tq_{demand\_2}$; $\Delta Tq_{demand} = Tq_{demand\_2} - Tq_{demand\_1}$; and then retain this second value $Tq_{demand}$, for a longer period of time than the injection time period $t_{inj}$. When at least one significant change $\Delta Tq_{demand}$ thus corresponds to one or more peaks/leaps for the requested torque $Tq_{demand}$, these peaks/leaps must extend for a longer time period than the injection time period $t_{inj}$, in order to ensure the desired adjustment with certainty.

Analyses have indicated that the powertrain of the vehicle has a natural oscillation, which is dependent on the components that are part of the powertrain and the configuration/composition of these components. This natural oscillation has a certain natural frequency $f_{driveline\_osc}$, which corresponds to a time period $t_{driveline\_osc}$ for the natural oscillation. According to one embodiment of the present invention, the insight into and knowledge of the powertrain's natural oscillations is used to determine a time period $t_{inertia}$, over which the at least one significant change $\Delta Tq_{demand}$ of the torque requested from the engine extends. This significant change $\Delta Tq_{demand}$ of the torque requested from the engine is here to be extended for a time period $t_{inertia}$ that is longer than one injection period $t_{inj}$ and is shorter than a part $$\frac{1}{X}$$

of the cyclic duration $t_{driveline\_osc}$ for natural oscillations in the powertrain;

$$t_{inj} < t_{inertia} < \frac{1}{X} t_{driveline\_osc}.$$

Therefore, the requested torque here must be changed from a first value $Tq_{demand\_1}$ to a second value $Tq_{demand\_2}$; $\Delta Tq_{demand} = Tq_{demand\_2} - Tq_{demand\_1}$; and then retain this second value $Tq_{demand\_2}$ for a shorter time period than the part $$\frac{1}{X}$$

of the cyclic duration $t_{driveline\_osc}$.

If this part $$\frac{1}{X}$$

is suitably chosen, then the at least one significant change $\Delta Tq_{demand}$ of the requested torque may occur during a substantially linear part of the natural oscillation. For example, the part $$\frac{1}{X}$$

may be an eighth $$\frac{1}{8}; t_{inj} < t_{inertia} < \frac{1}{8} t_{driveline\_osc};$$

whereby the probability is great that the at least one significant change $\Delta Tq_{demand}$ occurs during a part of the cyclic duration $t_{driveline\_osc}$ wherein the sinus-shaped natural oscillation has a relatively straight/non-curved shape.

In general, adjustments may be said to be more exact when a shorter part $$\frac{1}{X}$$

of the cyclic duration $t_{driveline\_osc}$ is used, that is to say, for greater values on x, as a more linear part of the natural oscillation is then used for the control. However, the part $$\frac{1}{X}$$

of the cyclic duration $t_{driveline\_osc}$ cannot be made shorter indefinitely, since, as the amplitude difference $\Delta Tq_{demand}$ for the requested torque, which is required to achieve the change of the time derivative $\Delta T'q_{fw}$ increases, the shorter the part $$\frac{1}{X}$$

of the cyclic duration $t_{driveline\_osc}$ is, and as there are limits as to how short this amplitude difference may be $\Delta Tq_{demand\_min} < \Delta Tq_{demand} < \Delta Tq_{demand\_max}$.

According to one embodiment, a size of the change of the time derivative $\Delta T'q_{fw}$ is related to a size of the significant change $\Delta Tq_{demand}$, i.e. the amplitude difference, of the torque requested from the engine and of a time $t_{inertia\_der}$ it takes to implement the change of the time derivative $\Delta T'q_{fw}$.

This may be seen as if an area A for a surface being delimited by the change $\Delta Tq_{demand}$ of the torque requested by the engine and by the time $t_{inertia\_der}$ it takes to perform the change $\Delta T'q_{fw}$; $A = \Delta Tq_{demand} t_{inertia\_der}$; is required to change the time derivative $\Delta T'q_{fw}$ for the dynamic torque.

Therefore, in general a corresponding change of the time derivative $\Delta T'q_{fw}$ for the dynamic torque may be achieved with a greater change $\Delta Tq_{demand}$ of the requested torque during a shorter period of time $t_{inertia\_der}$ than may be achieved with a smaller change $\Delta Tq_{demand}$ of the requested torque during a longer period of time $t_{inertia\_der}$, if the area A of the surfaces that these changes delimit is the same size.

The time $t_{inertia\_der}$ it takes to change the time derivative $\Delta T'q_{fw}$ for the dynamic torque is dependent on the time $t_{inertia}$ it takes to perform the significant change $\Delta Tq_{demand}$ of the torque requested from the engine 101. As there are limits as to how great the amplitude difference/the change of the requested torque may be $\Delta Tq_{demand\_min} < \Delta \Delta Tq_{demand} < \Delta Tq_{demand\_max}$, and as a certain change $\Delta T'q_{fw}$ of the dynamic torque requires a certain area A, the limitations of the amplitude difference/change of the requested torque $\Delta Tq_{demand\_min} < \Delta Tq_{demand} < \Delta Tq_{demand\_max}$ will sometimes mean that the time $t_{inertia}$ it takes to perform the significant change $\Delta Tq_{demand}$ is extended, which also means that the time $t_{inertia\_der}$ it takes to change the time derivative $\Delta T'q_{fw}$ is extended as well.

The control according to the present invention may occur in the direction of a desired gradient/change/derivative $T'q_{fw\_req}$ for the dynamic torque. The desired derivative $T'q_{fw\_req}$ for the dynamic torque may be related to a driving mode used in the vehicle. Several such driving modes are defined for vehicles, for example an economic driving mode (ECO), a powerful driving mode (POWER) and a normal driving mode (NORMAL). The driving modes define, for example, how aggressively the vehicle will behave and what feeling the vehicle will convey when being driven, wherein this aggression is related to the derivative $T'q_{fw\_req}$ for the dynamic torque.

The desired derivative $T'q_{fw\_req}$ for the dynamic torque may be related to a calibration of at least one parameter, which is related to a risk for jerkiness of the powertrain. For example, a maximum value a T'q$_{fw\_req\_max}$ for the desired derivative may be calibrated to a value compensating for jerks in the powertrain when relatively large changes in the requested torque occur, for example when an accelerator pedal is depressed or released relatively quickly.

The desired derivative T'q$_{fw\_req}$ for the dynamic torque may be related to, and provide, a ramping down or a ramping up prior to a shift operation in the gearbox 103, or a ramping up or a ramping down after a shift operation in the gearbox.

The desired derivative T'q$_{fw\_req}$ for the dynamic torque may be related to, and provide, a ramping down before the release of a clutch 106, or a ramping up after the engaging of the clutch 106.

Figure 3:
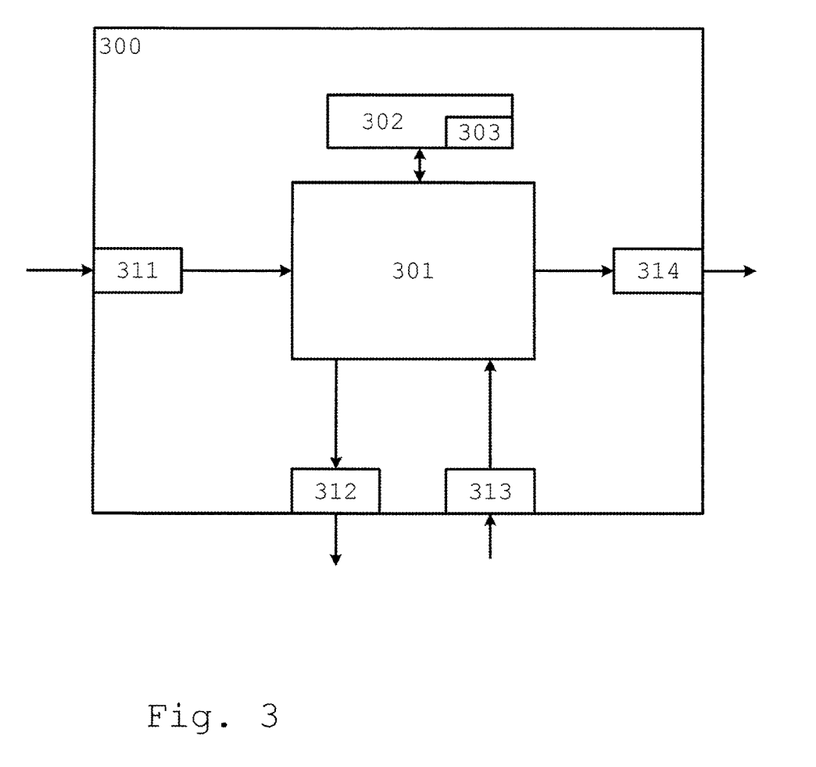
FIG. 3 shows a control device, in which a method according to the present invention may be implemented, FIGS. 4A-B schematically show a block diagram for a prior art fuel injection systems, and a fuel injection system comprising a control system according to the present invention.

A person skilled in the art will realize that a method for the change of a time derivative ΔT'q$_{fw}$ for a dynamic torque according to the present invention, may also be implemented in a computer program, which when executed in a computer will cause the computer to carry out the method. The computer program usually consists of a part of a computer program product 303, where the computer program product comprises a suitable digital storage medium on which the computer program is stored. Said computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

FIG. 3 schematically shows a control device 300. The control device 300 comprises a calculation unit 301, which may consist of substantially a suitable type of processor or microcomputer, e.g. a circuit for digital signal processing (Digital Signal Processor, DSP), or a circuit with a predetermined specific function (Application Specific Integrated Circuit, ASIC). The calculation unit 301 is connected to a memory unit 302, installed in the control device 300, providing the calculation device 301 with e.g. the stored program code and/or the stored data, which the calculation device 301 needs in order to be able to carry out calculations. The calculation unit 301 is also arranged to store interim or final results of calculations in the memory unit 302.

Further, the control device 300 is equipped with devices 311, 312, 313, 314 for receiving and sending of input and output signals. These input and output signals may contain wave shapes, pulses, or other attributes, which may be detected as information by the devices 311, 313 for the receipt of input signals, and may be converted into signals that may be processed by the calculation unit 301. These signals are then provided to the calculation unit 301. The devices 312, 314 for sending output signals are arranged to convert the calculation result from the calculation unit 301 into output signals for transfer to other parts of the vehicle's control system and/or the component(s) for which the signals are intended, for example to the engine.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation unit 301, and that the above-mentioned memory may consist of the memory unit 302.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than shown in FIGS. 1 and 3, as is well known to a person skilled in the art within the technology area.

The present invention, in the embodiment displayed, is implemented in the control device 300. The invention may, however, also be implemented wholly or partly in one or several other control devices, already existing in the vehicle, or in a control device dedicated to the present invention.

Figure 4A:
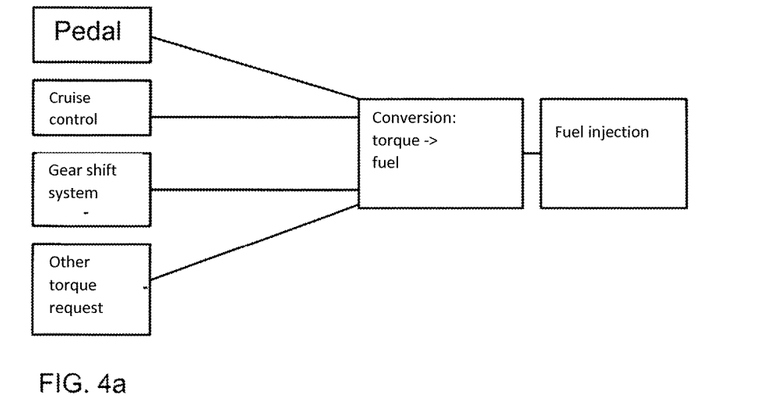
Figure 4B:
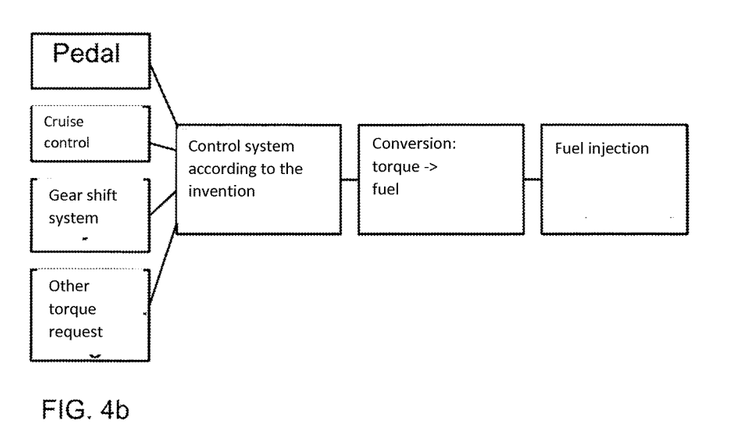

FIGS. 4A-B show a schematic block diagram for a prior art fuel injection system (FIG. 4A) and a fuel injection system comprising a control system according to the present invention (FIG. 4B).

In order to determine how much fuel to inject into the engine, information/indications of the torque requested have been used in vehicles for a long time for example, signals and/or mechanical indications from, for example a driver-controlled accelerator pedal, a cruise control and/or a shifting system. The amount of fuel to be injected into the engine is then calculated based on the information/indications. In other words, a direct re-interpretation/conversion of the information/indication into a corresponding amount of fuel is carried out. This fuel is then injected into the cylinders of the engine in order to operate the engine. This prior art procedure is shown schematically in FIG. 4A. Thus, using prior art, a direct transfer of the information/indication from, for example, the accelerator pedal to the static torque achieved by the fuel injection is received and used. In other words, for example the indication from the accelerator pedal Tq$_{from\_acc\_pedal}$, is here directly used to calculate the requested torque Tq$_{demand}$; Tq$_{demand}$=Tq$_{from\_acc\_pedal}$.

When the present invention is used in the fuel injection system, a regulator/control system is introduced, as illustrated in FIG. 4B, i.e. the system according to the present invention, which is arranged for the control of a torque Tq$_{demand}$ requested from the engine in a vehicle, between the accelerator pedal, the cruise control and/or the shifting system and the conversion of the torque to fuel. Thus, the regulator/control system, which achieves the requested/desired behavior/profile for the dynamic torque, is comprised in this system according to the present invention. It is thus this dynamic torque which is calculated/converted to the amount of fuel to be injected into the engine during combustion. In other words, the indication from the accelerator pedal Tq$_{from\_acc\_pedal}$ is here first transformed into a torque request for the dynamic torque, for example by means of the use of an equation, with the indication from the accelerator pedal Tq$_{from\_acc\_pedal}$ introduced into the equation:

$$Tq_{demand} = Tq_{fw\_pres} + t_{delay\_total} \frac{Tq_{from\_acc\_pedal} - Tq_{fw\_pres}}{\tau},$$

whereat fuel corresponding to this torque request Tq$_{demand}$ will be injected into the engine. Here, Tq$_{fw\_pres}$ is the current value for the dynamic torque. The total delay time t$_{delay\_total}$ corresponds to the time it takes from the determining of at least one parameter value until a change in the dynamic torque Tq$_{fw}$, based on the determined at least one parameter value, has been performed. The calibration parameter τ is related to a settling in period for the control/regulator and has the time dimension. The calibration parameter τ may be set to a smaller value if a quicker settling in is desirable, and to a greater value if a slower settling in is desirable.

Other control equations could also have been used in the same manner, as the person skilled in the art will realize. This means that the current dynamic torque $Tq_{fw\_pres}$ according to the present invention is controlled towards the indication from the accelerator pedal $Tq_{from\_acc\_pedal}$ When the present invention is used, the accelerator pedal, the cruise control, the shift system or another possible torque requester may be used, in order to request and/or provide a dynamic torque, rather than the static torque requested in prior art systems (FIG. 4A).

Figure 5A:
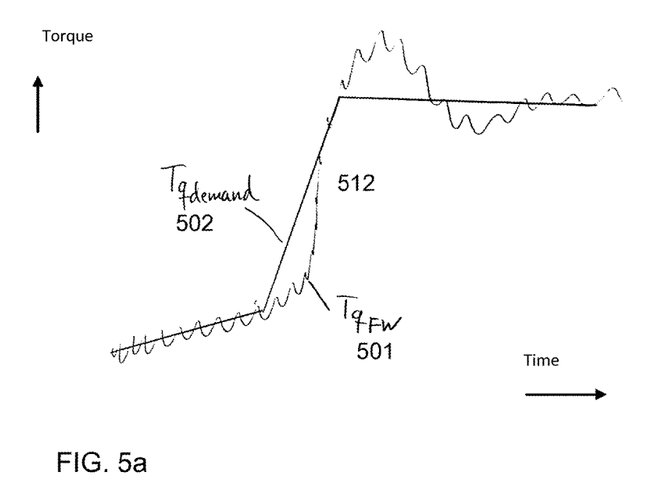
FIGS. 5A-B show a driving mode, wherein a prior art control is applied, and wherein a control according to the invention is applied, respectively.

FIG. 5A shows a control according to prior art, wherein a static torque request is implemented for a change of the engine torque for a driving mode, which, for example, may correspond to an increase/decrease of the engine torque 512, i.e. a ramping up, for example after a shift operation, after which the torque should remain substantially at the same level.

The graph 501 shows the dynamic torque $Tq_{fw}$, which is the result of the control. The graph 502 shows the requested torque $Tq_{demand}$. It is evident from the figure that the resulting dynamic torque $Tq_{fw}$ 501 oscillates significantly, that is with a great amplitude, both during the ramping up 512 and once the torque has not been changed for a while, which will be experienced as very unpleasant for the driver and/or the passengers in the vehicle.

Figure 5B:
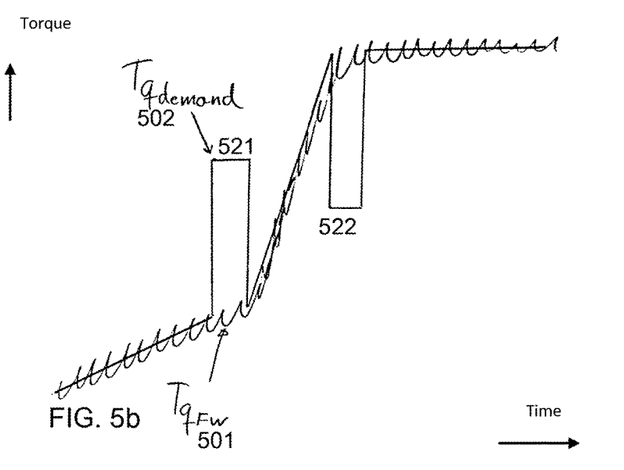

FIG. 5B shows a control according to an embodiment of the present invention, wherein a dynamic torque request is implemented for a driving mode corresponding to the one illustrated in FIG. 5A. The graph 501 shows the dynamic torque $Tq_{fw}$, which is the result of the control. The graph 502 shows the requested torque $Tq_{demand}$. According to the present invention, significant changes $\Delta Tq_{demand}$ of the requested torque $Tq_{demand}$ are permitted in the form of peaks, leaps or similar for the requested torque $Tq_{demand}$, compared with torque requests according to prior art. These significant changes $\Delta Tq_{demand}$ are here used to achieve changes to the time derivative $\Delta T'q_{fw}$ for the dynamic torque 501, in order to "tilt" the gradient for the dynamic torque 501. These changes of the time derivative $\Delta T'q_{fw}$ for the dynamic torque 501 may be made substantially instantaneously by means of the present invention.

Examples of such changes of the time derivative $\Delta T'q_{fw}$ through significant changes $\Delta Tq_{demand}$ of the requested torque $Tq_{demand}$ may be seen at a first 521 and a second 522 occasion in FIG. 5B. At the first occasion 521, the dynamic torque 501 $\Delta T'q_{fw}$ is angled upwards by the use of a positive peak $\Delta Tq_{demand}$ of the requested torque $Tq_{demand}$ 502. At the second occasion 512, the dynamic torque 501 $\Delta T'q_{fw}$ is angled downwards again to an almost horizontal angle by the use of a negative peak $\Delta Tq_{demand}$.

By using the present invention, the requested torque $Tq_{demand}$ may achieve, at least in part, a relatively jerky and uneven profile in FIG. 5B. This is permitted according to the present invention, as the focus of the control is on providing the dynamic torque $Tq_{fw}$ 501 with a more even and substantially non-oscillating form. As is evident from FIG. 5, the result of the control is also that the dynamic torque $Tq_{fw}$ 501 oscillates considerably less, that is it has considerably smaller amplitude than the dynamic torque $Tq_{fw}$ 501, as per prior art control in FIG. 5A. Thereby a better comfort and also a better performance is achieved through the use of the present invention, at the same time as the dynamic torque $Tq_{fw}$ 501 is reliably controlled in the direction of the desired derivative.

In this document, devices are often described as being arranged to carry out steps in the method according to the invention. This also comprises that the devices are adapted and/or set up to carry out these method steps.

The present invention is not limited to the embodiments of the invention described above, but relates to and comprises all embodiments within the protected scope of the enclosed independent claims.

The invention claimed is:

1. A system configured to control a change of a time derivative for a dynamic torque, the dynamic torque is provided to an output shaft from an engine in a vehicle, the system comprising:
   a first determining device configured for determining a desired change of the time derivative for the dynamic torque from a current value to a new desired value;
   a second determining device configured for determining a current rotational difference between a first end of a powertrain in the vehicle rotating with a first rotational speed, and a second end of the powertrain rotating with a second rotational speed;
   a torque control device configured for performing controls of the first rotational speed,
   wherein the control of the first rotational speed is based on a desired value for the time derivative for the dynamic torque, on a spring constant related to a torsional compliance in the powertrain and on the current rotational speed,
   wherein the current value for the time derivative for the dynamic torque is indirectly controlled in the direction towards the desired value, through the control of the said first rotational speed.

2. The system according to claim 1, wherein the first rotational speed corresponds to an engine speed for the engine,
   wherein $\omega_1 = \omega_e$.

3. The system according to claim 2, wherein the second rotational speed corresponds to a geared rotational speed for at least one of the driven wheel in the vehicle, wherein $\omega_2 = \omega_{wheel}$.

4. The system according to claim 1, wherein the spring constant is selected from the group consisting of:
   a spring constant for the driving shafts in the vehicle, related to a gear ratio for the powertrain, which dominates the spring constant for the powertrain; and
   a total spring constant for the powertrain.

5. The system according to claim 1, further comprising:
   a third determining device configured for determining the spring constant by one or more of the group consisting of:
   a calculation based on a configuration of one or more components in the powertrain, wherein a relation to the spring constant is known for the one or more components; and
   an, at least in part, continuously adaptive estimation, which estimates the spring constant during the driving of the vehicle.

6. The system according to claim 1, wherein the torque control device is configured to achieve the change to the time derivative for a dynamic torque by at least one significant change of a torque requested from the engine.

7. The system according to claim 6, wherein the torque control device is configured to indirectly control the first rotational speed by controlling the requested torque.

8. The system according to claim 6, wherein each of the at least one significant change is of a size within a range corresponding to 10%-100% of a total available torque for the engine during a calculation period for a control device which performs the control.

9. The system according to claim 6, wherein each of the at least one significant change of the torque requested from the engine extends for a time period, which is longer than an injection period and is shorter than a part of a cyclic duration for a natural oscillation in the powertrain,
wherein $$t_{inj} < t_{inertia} < \frac{1}{X} t_{driveline\_osc}.$$

10. The system according to claim 6, wherein a size of the change of the time derivative is dependent on the size of the significant change of the torque requested from the engine, and of a time that elapses in order to perform the change to the time derivative.

11. The system according to claim 6, wherein a time elapsing in order to change the time derivative is dependent on a time elapsing in order to perform the significant change of the torque requested from the engine.

12. The system according to claim 1, wherein the time derivative for the dynamic torque is proportional to the rotational speed difference.

13. The system according to claim 1, wherein the torque control device is configured to control the change of the time derivative for the dynamic torque, such that substantially instantaneous changes of the time derivative are achieved.

14. A method for controlling a change of a time derivative for a dynamic torque, which is provided to an output shaft from an engine in a vehicle, the method comprising:
determining a desired change of the time derivative for the dynamic torque from a current value to a new desired value;
determining a current rotational speed difference between a first end of a powertrain in the vehicle, which rotates with a first rotational speed, and a second end of the powertrain, which rotates with a second rotational speed;
controlling the first rotational speed based on the desired value for the time derivative for the dynamic torque, on a spring constant related to a torsional compliance in the powertrain, and on the current rotational speed,
wherein the current value for the time derivative for the dynamic torque is indirectly controlled in the direction towards the desired value, through the control of the first rotational speed.

15. A computer program product comprising a non-transitory computer readable medium incorporating a computer program, that when executed in a computer causes the computer to carry out the method according to claim 14.

* * * * *